United States Patent [19]

Rodgers

[11] 4,267,988
[45] May 19, 1981

[54] SNAP-LOCK MECHANISM FOR HIGH-G PLATFORM

[75] Inventor: Aubrey Rodgers, Huntsville, Ala.

[73] Assignee: The United States of America as represented by the Secretary of the Army, Washington, D.C.

[21] Appl. No.: 32,192

[22] Filed: Apr. 23, 1979

[51] Int. Cl.³ .............................................. F41G 7/26
[52] U.S. Cl. ................................................... 244/3.16
[58] Field of Search ................. 244/3.16, 3.2; 74/5 R, 74/5.2, 5.4

[56] References Cited

U.S. PATENT DOCUMENTS

| | | | |
|---|---|---|---|
| 2,963,973 | 12/1960 | Estey | 244/3.16 |
| 3,756,538 | 9/1973 | McLean | 244/3.16 |
| 4,155,521 | 5/1979 | Evans et al. | 244/3.16 |

*Primary Examiner*—Charles T. Jordan
*Attorney, Agent, or Firm*—Nathan Edelberg; Robert P. Gibson; Harold W. Hilton

[57] ABSTRACT

A high-g gimbal platform carried by a rocket projectile for supporting an antenna or other type of terminal homing sensors which are required to survive a high-g launch phase including a snap-lock mechanism for providing a rigid bearing assembly. The snap lock mechanism uses the deceleration (negative acceleration) of high velocity projectiles in conjunction with elastomeric bearing housing rings to lock the rotor and gimbal bearing assemblies of the gimbal platform into a rigid, stable position prior to stabilization and guidance phase.

7 Claims, 3 Drawing Figures

SNAP-LOCK MECHANISM FOR HIGH-G PLATFORM

DEDICATORY CLAUSE

The invention described herein may be manufactured, used, and licensed, by or for the Government for governmental purposes without the payment to me of any royalties thereon.

BACKGROUND OF THE INVENTION

The snap-lock mechanism utilizes the deceleration of a high velocity projectile in conjunction with an elastomeric bearing housing to lock the rotor for retention thereof in a stable position.

SUMMARY OF THE INVENTION

A gimbal platform for supporting a load such as an antenna or other type of terminal homing sensors having a snap-lock mechanism that uses the deceleration of high velocity projectiles in conjunction with elastomeric bearing rings for locking the gimbal bearing assemblies in a rigid position. Separate snap-lock mechanisms are provided for the gimbal bearing and the rotor for retention thereof in a stable position.

DESCRIPTION OF THE PREFERRED EMBODIMENT

Figure 1:
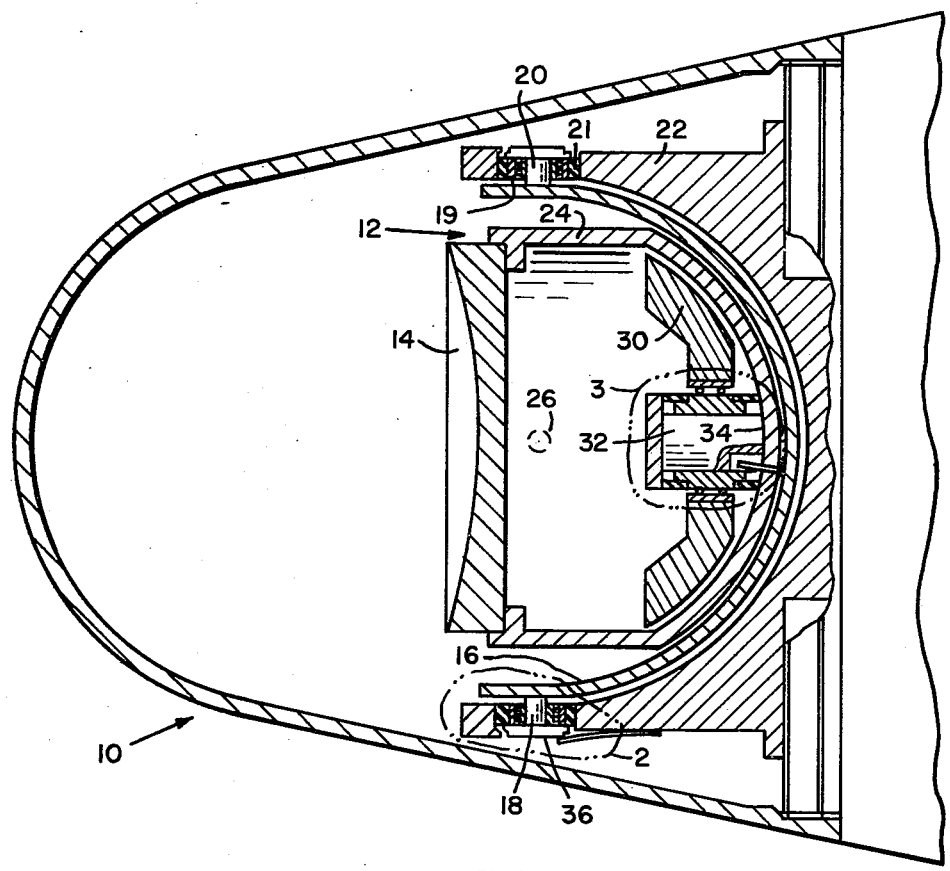
FIG. 1 is a cross sectional view of the gimbal platform of the present invention.

As seen in FIG. 1, a rocket projectile 10 is provided in the forward nose portion thereof with a gimbal platform 12 which includes an antenna 14 (or sensor) carried thereon. The assembly includes an outer gimbal assembly 16 secured by shafts 18 and 20 to a housing 22 which is secured to the projectile. An inner gimbal assembly 24 is secured by a pair of shafts 26 (only one shown) to outer gimbal assembly 16. A rotor 30 is secured to a shaft 32 which is secured to a hemispherical surface 34 of inner gimbal 24.

Figure 2:
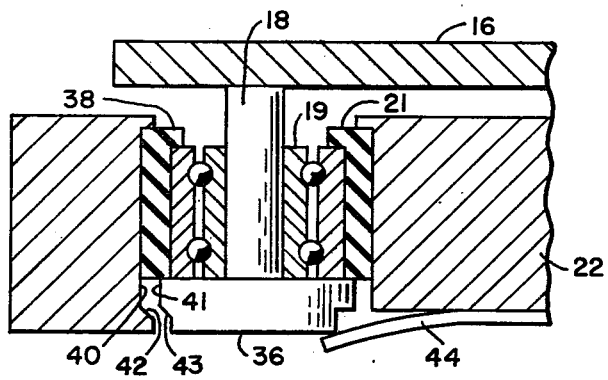
FIG. 2 is a partial sectional view of the rotor and snap-lock mechanism therefor.

The gimbal snap-lock mechanism (FIG. 2) includes a rigid bearing outer ring housing 36 secured to shafts 18 and 20. Shafts 18 and 20 are provided an elastomeric ring liner 21 therearound. A rigid gimbal surface 40 and shoulder surface 42 are provided on housing 22 and complimentary surfaces 41 and 43 are provided on member 36. A snaplock element 44 is secured to and extends from housing 22.

Figure 3:
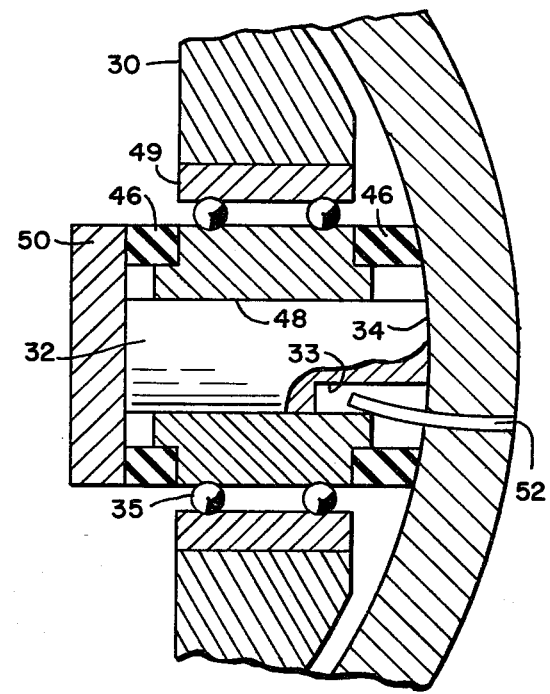
FIG. 3 is a partial sectional view of the outer gimbal and snap-lock mechanism therefor.

The rotor bearing snap-lock mechanism (FIG. 3) includes an elastomeric ring 46 disposed about shaft 32 between rigid seats 50 secured on the end of shaft 32 and intermediate the rotor spin bearing inner housing 48 and the inner surface of inner gimbal 24. A snap-lock element 52 extends from the inner surface 34 of the inner gimbal. Shaft 32 is provided with a slot 33 thereon for receiving snap-lock element 52 therein. Ball bearings 35 are disposed between inner housing 48 and an outer housing 49. Rotor 30 is secured to housing 49.

The drawing shows the rotor and gimbal bearings in the pre-launch positions. If a high-g acceleration force (12,000 g's) such as a 155-mm launch is applied to the platform, the spring constant of the elastomeric ring liners will allow the rotor and gimbals to move and seat on the rigid platform support surfaces as described in Patent Application Ser. No. 41 for "High-G Gimbal Platform, filed Jan. 2, 1979 by Aubrey Rodgers. After launch, the deceleration force (600-1000 g's) acting on the projectile and the spring constant of the elastomeric ring liner 38 will move rigid bearing housing 36 forward to seat against rigid gimbal housing surface 40 and rigid gimbal shoulder surface 42. The snap-lock element 44 will snap-in and seat against rigid bearing housing surfaces 36. Snap-lock element 44 will retain rigid gimbal bearing housing 36 against surfaces 40, 42 thus securing the gimbals in rigid axial and transverse positions. Simultaneously, the deceleration environment and ring liners 46 force rotor bearing 48 forward to seat against surface 50 and pop-out snap-lock element 52 secures inner ring 48 into a rigid position.

The elastomeric ring liners 38 and 46 permit the projectiles high-g accelerating loads to be supported by the platform gimbals and housing structures thus protecting the rotor and gimbal bearings. The projectile's lower deceleration levels allow the rotor and gimbals to move forward and the snap-lock elements 44, 52 secure the gimbals and rotor into a rigid position prior to the guidance phase of the projectile.

I claim:

1. In a projectile having a platform assembly disposed for surviving a high-g launch phase, said platform assembly comprising:
   a. a platform;
   b. first and second gimbal members carried in gimballed relation therebetween and with said platform, said first and second gimbal members being disposed in concentric relation;
   c. a rotor supported in said first gimbal member;
   d. a first support assembly including compliant support means for support of said rotor in said first gimbal member;
   e. a second support assembly including compliant support means for support of said second gimbal member in said platform; and,
   f. a third support assembly including compliant support means for support of said first gimbal member in said second gimbal member;
   g. snap-lock means cooperating with said support assemblies for rigidly securing said rotor and gimbal members into a stable position responsive to deceleration of said projectile.

2. Apparatus as in claim 1 wherein said compliant support means is an elastomeric member.

3. Apparatus as in claim 2 wherein said first support assembly includes a shaft secured to said first gimbal member, a first bearing assembly carried around said shaft for support of said rotor thereon, a seat secured to said shaft, said elastomeric member disposed between said seat and said bearing assembly and between said first gimbal member and said first bearing assembly.

4. Apparatus as in claim 3 wherein said second support assembly includes a first pair of shafts secured to said second gimbal member and carried in said platform, a second bearing assembly supported in said platform and carried about said first pair of shafts, said elastomeric member supported between said platform and said second bearing assembly, an outer ring housing secured to the ends of said first pair of shafts and having a seat thereon, said platform having a complimentary seat thereon.

5. Apparatus as in claim 4 wherein said third support assembly includes a second pair of shafts secured to said first gimbal member and carried in said second gimbal member, a third bearing assembly carried about said second pair of shafts, said elastomeric member carried between said second gimbal member and said third bearing assembly.

6. Apparatus as in claim 3 wherein said shaft includes a slot therein, said snap-lock member being a leaf spring like member extending into said slot for engagement with said second bearing assembly responsive to said deceleration.

7. Apparatus as in claim 4 wherein said snap-lock means is a leaf spring like member extending from said platform for engagement with said ring housing for securing said second gimbal assembly in a rigid position responsive to deceleration of the projectile.

* * * * *